Figure 1:
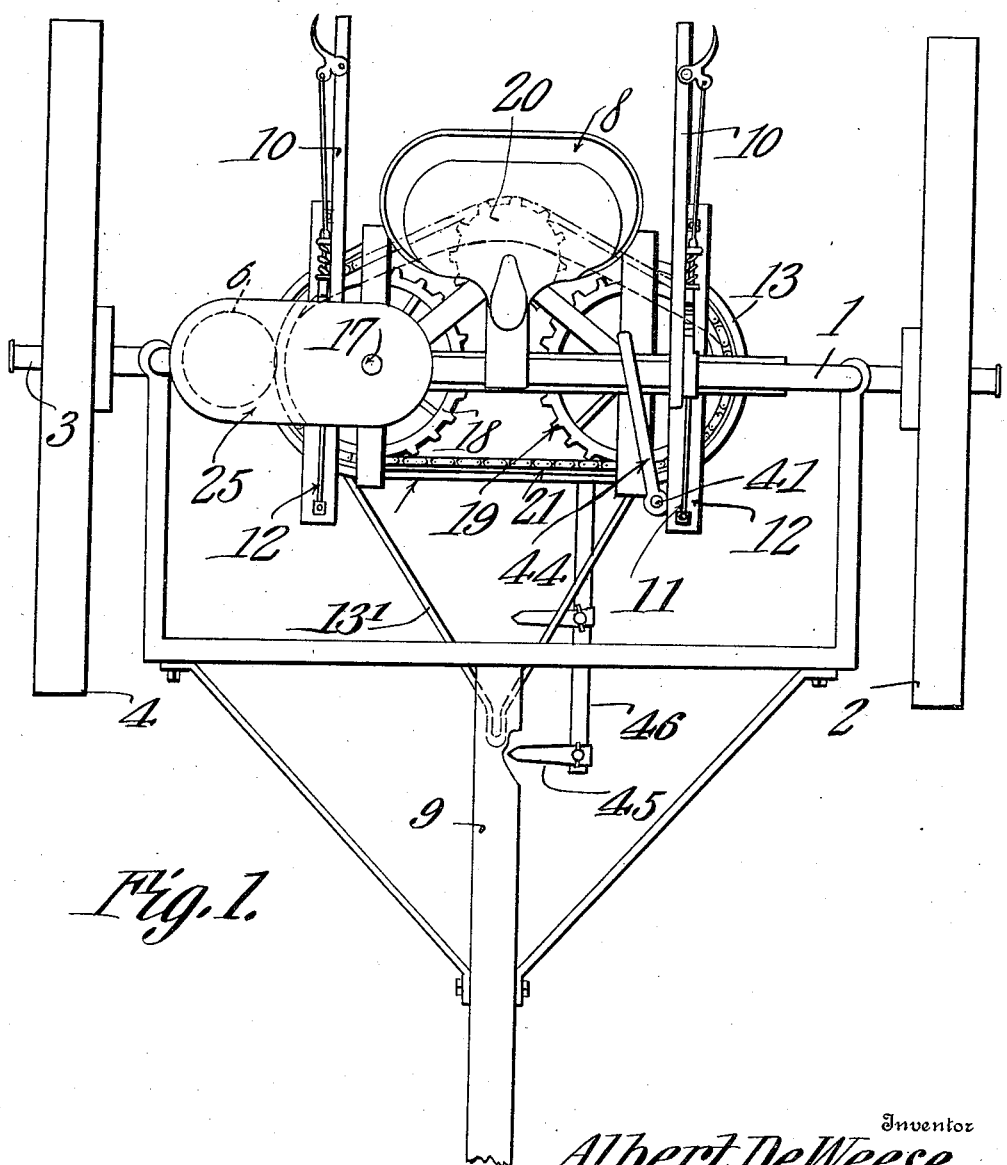

A. DE WEESE.
SELECTIVE COTTON CHOPPER.
APPLICATION FILED DEC. 6, 1909.

1,033,789.

Patented July 30, 1912.
4 SHEETS—SHEET 1.

Witnesses

Inventor
Albert DeWeese.

By C. A. Snow & Co.
Attorneys

A. DE WEESE.
SELECTIVE COTTON CHOPPER.
APPLICATION FILED DEC. 6, 1909.
1,033,789.
Patented July 30, 1912.
4 SHEETS—SHEET 2.
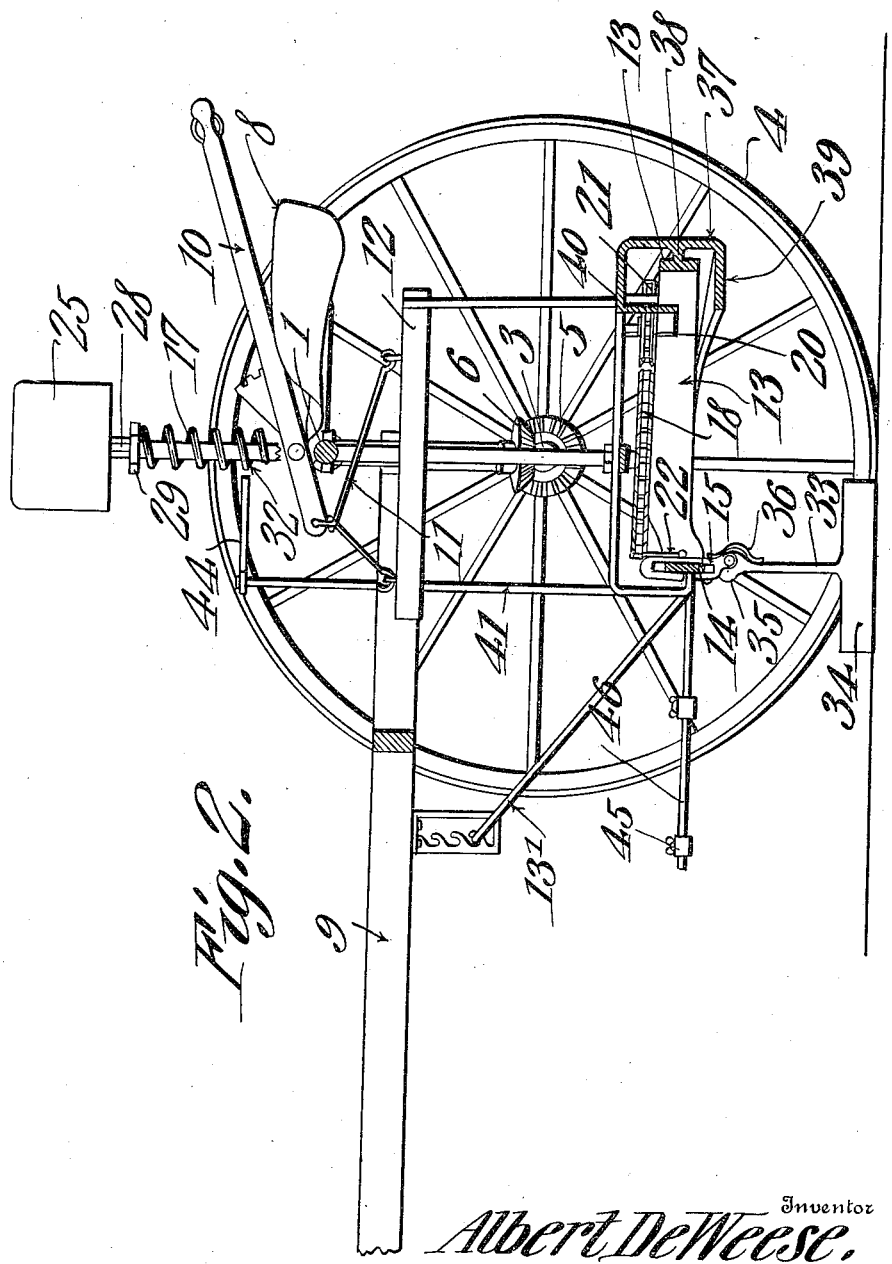

A. DE WEESE.
SELECTIVE COTTON CHOPPER.
APPLICATION FILED DEC. 6, 1909.
1,033,789.
Patented July 30, 1912.
4 SHEETS—SHEET 3.
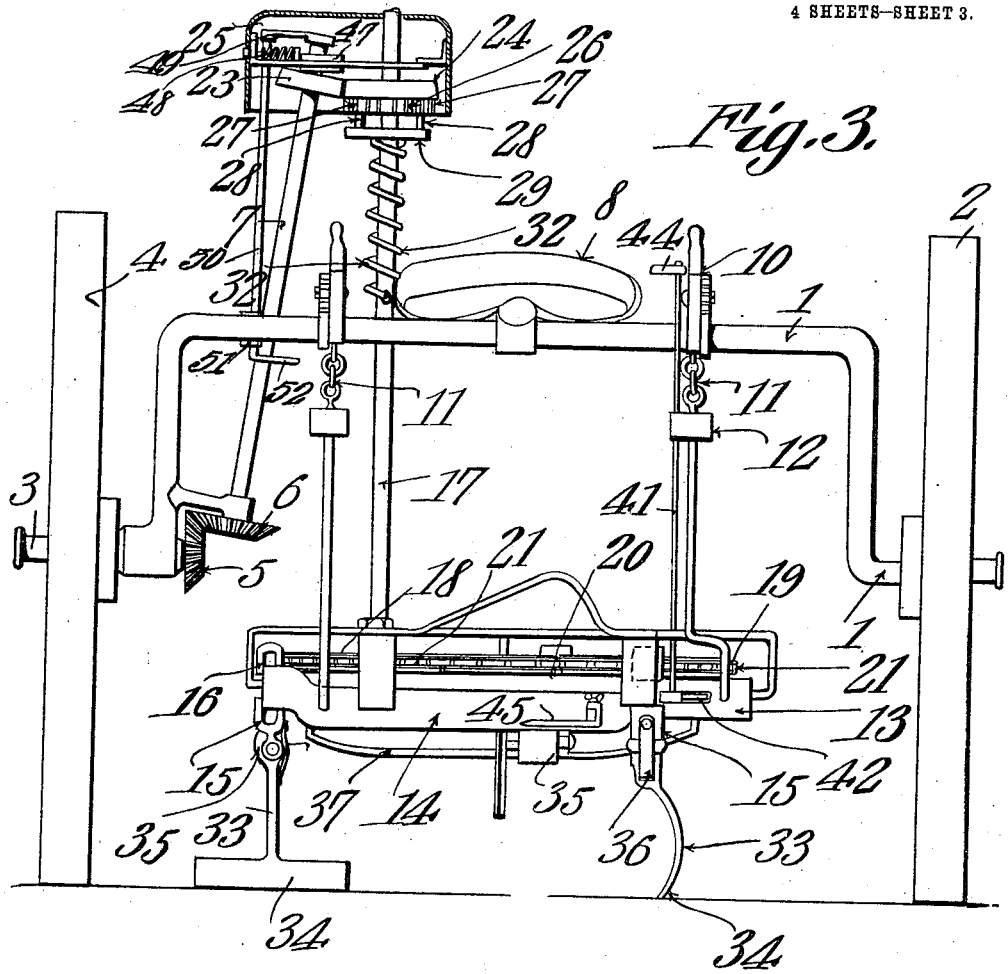
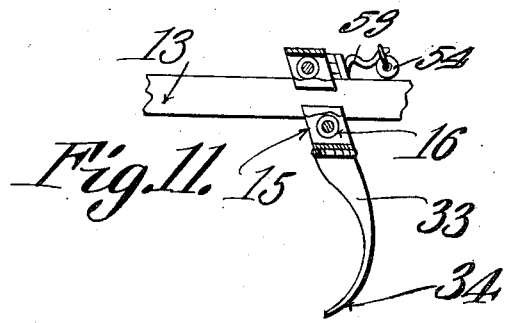
Witnesses
E. F. Stewart
J. T. Lawson
Inventor
Albert DeWeese.
By C. A. Snow & Co.
Attorneys

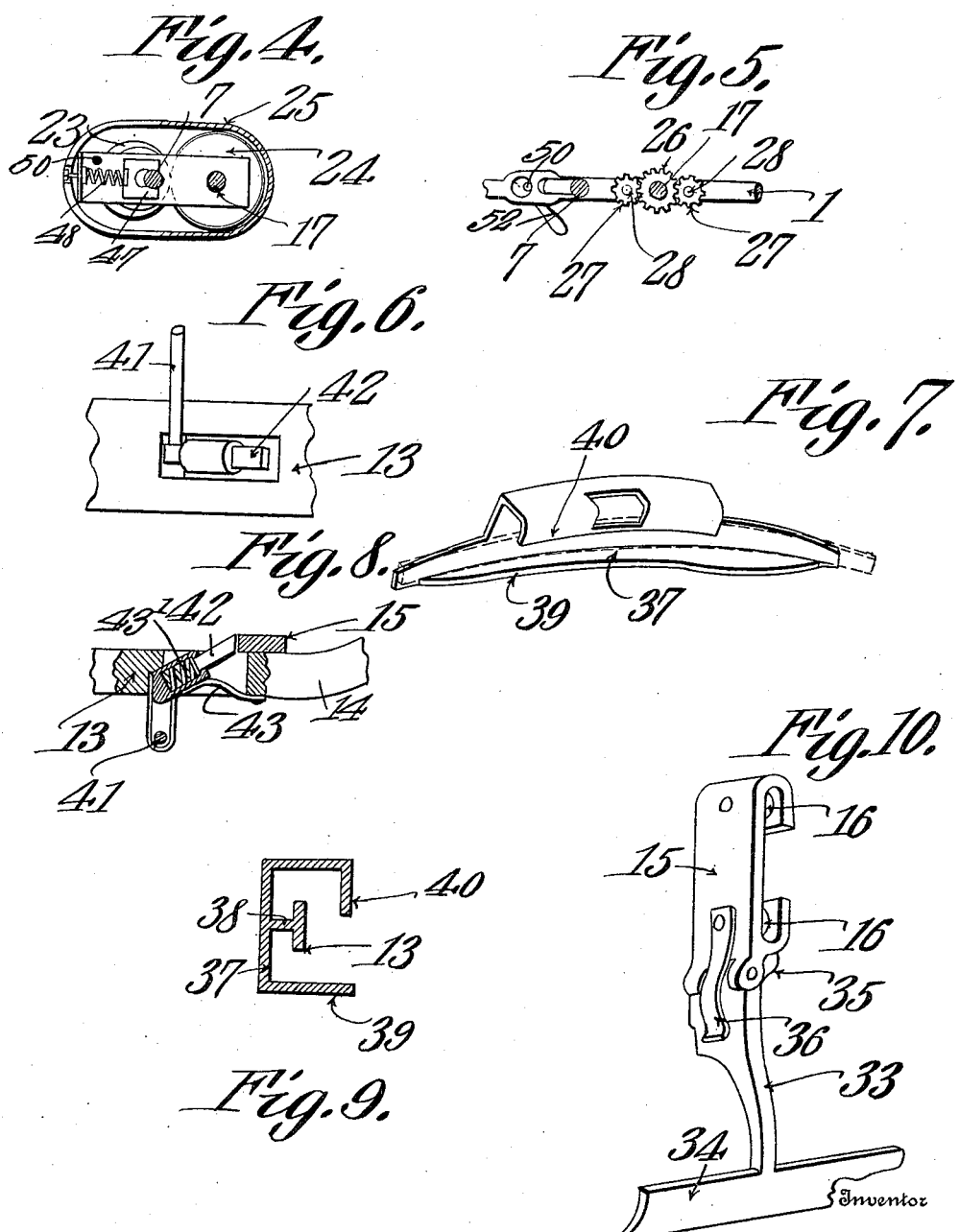

UNITED STATES PATENT OFFICE.

ALBERT DE WEESE, OF PHILADELPHIA, MISSISSIPPI.

SELECTIVE COTTON-CHOPPER.

1,033,789.

Specification of Letters Patent. Patented July 30, 1912.

Application filed December 6, 1909. Serial No. 531,673.

*To all whom it may concern:*

Be it known that I, ALBERT DE WEESE, a citizen of the United States, residing at Philadelphia, in the county of Neshoba and State of Mississippi, have invented a new and useful Selective Cotton-Chopper, of which the following is a specification.

This invention has relation to cotton choppers and it consists in the novel construction and arrangement of its parts as hereinafter shown and described.

The object of the invention is to provide a simple and an effective chopper adapted to be used in such manner as to chop out undesirable plants in a row and leave desirable plants and the chopper is of the kind known as selective.

With the above object in view the chopper comprises a wheel mounted axle with which is connected a draft tongue and from which is hung a frame. Means is provided upon the axle for raising and lowering the frame. The frame includes as a component part an endless track of peculiar configuration and a set of carriers arranged to travel upon the said track. A chain is mounted for orbital movement upon the frame and means is provided for transmitting motion from one of the supporting wheels of the chopper to the said chain. The chain is connected by means of links with the carriages. Blades are pivotally connected to the carriages and are held in normal positions under spring tension. The said track is provided with a depressed section along which the carriages pass when the blades are cutting a stroke transversely across the row of plants and means is provided for swinging the said blades upon their pivots as they recross the row of plants or the row from which the plants have been removed. An indicator is attached to the frame and is provided with adjustable points which may be so positioned upon the arm of the indicator as to be adjacent plants in the row which would remain standing as the blades pass transversely across the row and the chopper is progressing along the row. In other words, the point will indicate to the operator the plants that will be missed by the blades and means is provided for interrupting the operation of the blades so that the chopper may be advanced along the row until the said point arrives at the plants desired to be left standing.

In the accompanying drawings:—Figure 1 is a top plan view of the cotton chopper. Fig. 2 is a vertical longitudinal sectional view of the same. Fig. 3 is a front elevation of the same. Fig. 4 is a horizontal sectional view of a friction transmission means used upon the chopper. Fig. 5 is a horizontal sectional view of an escapement device used in conjunction with the friction transmission. Fig. 6 is a side elevation of a checking pawl used upon the chopper. Fig. 7 is a detailed perspective view of the blade swinging device. Fig. 8 is a horizontal sectional view of the pawl mechanism shown in Fig. 6. Fig. 9 is an enlarged sectional view of the blade swinging device. Fig. 10 is a detailed perspective view of one of the carriages and attached blades. Fig. 11 is a detail sectional view of a modified form of blade and carriage.

The cotton chopper includes an arch axle 1, to one end of which is journaled a supporting wheel 2. A spindle 3 is journaled for rotation in the other end of the axle 2 and a supporting wheel 4 is fixed to the outer portion of the said spindle 3. A beveled pinion 5 is fixed to the inner end of the spindle 3 and meshes with a beveled pinion 6 which is fixed to the lower end of an upwardly disposed inclined shaft 7. An operator's seat 8 is mounted upon the intermediate portion of the axle 2 and a draft tongue 9 is connected with the said axle 1.

Levers 10 are fulcrumed upon the intermediate portion of the arch axle 1 at the opposite sides of the seat 8 and are connected by means of links 11 with the upper bars of a pendant frame 12. By swinging the said levers 10 the frame 12 may be raised or lowered or by swinging one of the levers one side of the said frame may be elevated with relation to the other side and vice versa. A track 13 is supported at the lower portion of the frame 12 and is approximately triangular in plan with its front side having a depressed portion 14 which lies approximately parallel with the intermediate portion of the axle 1. An adjustable brace 13' connects the forward portion of the track 13 with the tongue 9. Carriages 15 are arranged to travel along the track 13 and are provided with friction rollers 16 which bear against the edges of the said track.

A shaft 17 is journaled at its lower portion in the lower part of the frame 12 and a sprocket wheel 18 is fixed to the lower end of the said shaft 17. A sprocket wheel 19 is journaled for rotation above the track 13 at the side thereof opposite that side at which the wheel 18 is located and a sprocket wheel 20 is journaled for rotation over the rear portion of the said track 13. A sprocket chain 21 passes around the wheels 18, 19, and 20 and is provided at intervals along its length with pivoted links 22 which in turn are pivotally connected with the carriages 15.

A friction disk 23 is fixed to the upper end of the shaft 7 and bears against the periphery of a friction disk 24 loosely journaled upon the upper end of the shaft 17. The disks 23 and 24 are located under a hood or casing 25. A gear wheel 26 is fixed to the lower side of the friction disk 24 and meshes with pinions 27 which are fixedly connected to and carried by pins 28 rigid with a collar 29. The collar 29 is adapted to rotate freely on the shaft 17. A coiled spring 32 is secured at one end to this collar and surrounds the upper portions of the shaft 17, the other end of the spring being secured to the shaft 17 close to the arch axle 1.

To the lower portion of each carriage 15 is pivotally attached a shank 33 of a knife or blade 34. The blade 34 is disposed at an angle to the axis of the pivotal connection between the shank 33 and carriage 15. At one side the shank 33 is provided with a lug 35 which is adapted to bear against the lower end of the carriage 15 and upon the opposite side of the said carriage 15 is located a flat spring 36, the free end of which bears against the intermediate portion of the shank 33 and normally holds the lug 35 in engagement with the lower end of the carriage 15.

A guide 37 is provided with a laterally disposed web 38 which is attached to the outer side of the track 13. The said guide is provided at its lower portion with an inwardly disposed ledge or flange 39 which is located in the path of movement of the shank 33 of the blade 34. The said guide 37 is provided at its upper inner portion with a depending flange 40 which lies over the edge of the ledge or flange 39 and is adapted to prevent excessive swinging movement on the part of the blade shanks 33 when they come in contact with the ledge 39 in the manner hereinafter to be described.

A shaft 41 is journaled upon the frame 12 and is provided at its lower end with a pawl 42 which is normally held in the path of movement of the carriages 15 by a spring 43 which is fixed at one end to the track 13 and bears at its other end against the said pawl, a coiled spring 43' bearing against the pawl serving to cushion the latter and prevent breakage.

A lever 44 is fixed to the upper end of the shaft 41 and extends to within convenient reach of one occupying the seat 8.

The operation of the cotton chopper is as follows:—Assuming that the machine is being drawn along a row of standing plants and the pawl 42 is projected into the path of movement of the carriages 15, the edge of one of the said carriages will bear against the end of the said pawl as indicated in Fig. 8 of the drawing. At the same time the wheel 4 is rotating and through the intermeshing beveled pinions 5 and 6 rotary movement is transmitted to the shaft 7. By reason of the fact that the disk 23 mounted upon the shaft 7 is in frictional contact with the disk 24 upon the shaft 17 motion will be transmitted through gears 26 and 27 to collar 29 and thence through spring 32 to the said shaft 17 until the edge of the carriage 15 is brought into contact with the end of the pawl 42 as above described. When this happens, the carriage 15 is interrupted or checked in its movement as is also the belt 21 with which it is connected. Thus the shaft 17 is brought to a state of rest but for a short space of time the disk 24, gears 26 and 27 and collar 29 will continue to rotate upon the axis of the shaft 17 and wind the spring 32 about the shaft 17. During its winding the spring contracts and moves the sleeve 29 longitudinally along the shaft 17 and pulls the pinions 27 away from the gear 26. While the pinions 27 are thus held down by the spring, the teeth of gear 26 will slip over them as the said gear continues to rotate.

When it is desired that the blades 34 should commence to move in their prescribed orbit the operator grasps the handle 44 and swings the same whereby the shaft 41 is turned upon its axis and the pawl 42 is moved out of the path of the carriage 15 with which it is in engagement and against the tension of the spring 43. As soon as this occurs the tension of the spring 32 comes into play and the said spring elongates and forces the sleeve 29 toward the disk 24 and the pinions 27 into mesh with the gear 26. Inasmuch as the disk 23 in the meantime has been in a state of continuous rotation, the disk 24 immediately begins to rotate and rotary movement is transmitted from the said disk 24 through the pinion 26, pinions 27, pins 28, sleeve 29 and spring 32 to the shaft 17. Thus the sprocket wheel 18 fixed at the lower end of the shaft 17 turns upon the axis of the said shaft and the belt moves in its orbit about the wheels 18, 19, and 20. At this movement, that carriage which has been in contact with the pawl 42 passes upon the depressed section 14 of the track 13 and the blade 43 carried by the said carriage is conducted across the row of standing plants with a swift movement which causes the said blade to effectually chop out the undesired plants while those plants which are standing in the row beyond the ends of the blades are permitted to remain. It must be taken into consideration that during this movement of the blades 34 the machine is progressing or moving along the row and in order to establish a predetermined point at which the blade 34 shall cut across the row the adjustable pointers 45 are mounted upon an indicator arm 46 which in turn is carried by the frame 12. The said pointers 45 may be so positioned that when one or both of the said pointers are adjacent a desired plant, the handle lever 44 may be swung and thus when the machine advances along the row, the liberated blade 34 will cut out the undesired plants occurring adjacent the said desired plants. It is essential that the pointers 45 shall be adjustable upon the indicator arm 46 for the reason that when the stand of cotton plants is thinned, the machine may travel along the row at a comparatively fast rate of speed while when the stand is thick, the progress of the machine is necessarily retarded. Consequently it is desirable to have the points 45 adjustably mounted to meet the difference in the rate of speed at which the machine may be drawn over the surface of the ground.

When one of the blades 34 has made a transverse incision across the row of plants, the operator releases his grasp upon the handle lever 44 and upon the tension of the spring 43, the pawl 42 is again projected into the path of movement of the carriages 15 and the next succeeding carriage will engage the projecting end of said pawl and thus the movement of the carriages is interrupted. As the carriages pass along the rear portion of the track 13 the shanks 33 of the said carriages successively engage the ledge portion 39 of the guide 37 and the said shanks are swung laterally against the tension of the spring 36 and thus the blades 34 assume virtually vertical positions and are elevated above the plants left standing in the row so that they do not come in contact with the same as the machine passes along the row. As above indicated, the flange 40 is located above the shank 33 when the said shank comes in contact with the ledge 39 and consequently the upward movement of the said shank is limited but the movement is sufficient to permit the attached blade to escape the standing plants. As soon as the shank 33 arrives at the end of the ledge 39 which is elevated to the greatest extent and the said shank passes beyond the said ledge, the tension of the spring 36 comes into play and the shank 33 is swung down into substantial alinement with the carriage 15.

As will be seen by reference to Fig. 4, the upper portion of the shaft 7 is journaled in a slide bearing 47 that is actuated by a spring 48 to keep the disks 23 and 24 in contact and in order to break the contact when desired, there is loosely connected with the upper terminal of the shaft 7 one end of an arm 48, the other end of which is connected with the upper end of a rod 50, the lower end of which passes through a bearing 51 carried by the axle 1 and terminates in a lever 52 which upon being swung laterally by the operator will move the disk 23 away from the disk 24.

The modified form of carriage illustrated in Fig. 11 is provided with a spring 53 to which a roller 54 is loosely connected, this roller being adapted to travel along the track 13 and to hold the roller 16 close to the track and thereby prevent lost motion.

Thus it will be seen that a structure is provided which may be manually operated to chop out undesirable plants in a row of plants and permit certain plants to remain. It will also be seen that by swinging the handle lever 44 to one side so that the pawl 42 is held out of the path of movement of the carriages 15 that the said carriages are free to move in an orbit about the track and thus the plants may be chopped out of the row at regular intervals but with no regard as to selection. It will also be seen that by reason of the fact that the track section 14 is at all times substantially horizontal and is depressed with relation to the remainder of the track that the incision made by the blade will have a horizontal bottom and will not be concaved or furrowed so as to hold the moisture or expose the roots of the plants left standing.

Having described my invention, what I claim as new and desire to secure by Letters Patent is:—

1. In a cotton chopper, carriages mounted for movement in an endless path, a flexible connection between the carriages, means for moving said connection and the carriages, cutting blades movable with the carriages, and an endless track supported in an approximately horizontal position for guiding the carriages along a straight approximately horizontal path while the blades are cutting.

2. In a cotton chopper, carriages mounted for movement in an endless path, a flexible connection between the carriages, means for moving said connection and the carriages, blades pivotally connected to the carriages, an endless track for guiding the carriages along a straight approximately horizontal path while the blades are cutting, and means for swinging the blades upwardly out of cutting position during a portion of their movement.

3. In a cotton chopper, carriages mounted for movement in an endless path, a flexible connection between the carriages, means for moving said connection and the carriages, blades pivotally connected to the carriages, an endless track for guiding the carriages along a straight approximately horizontal path while the blades are cutting, and a guide fixed relative to the track and adapted to swing the blades in an upward direction out of cutting position during a portion of their movement.

4. In a cotton chopper, carriages mounted for movement along an endless path, a flexible connection between the carriages, blades carried by the carriages, an endless track supported in an approximately horizontal position, said track having a straight depressed portion for guiding the carriages along a straight line while the blades are in active position, and means for operating the blades and their connection.

5. A cotton chopper comprising an endless track supported in an approximately horizontal position, a series of carriages mounted for movement along the track, blades carried by the carriages, a chain mounted for orbital movement above the track and links connecting the said chain with the carriages.

6. A cotton chopper comprising an endless track, carriages mounted for movement along the track, blades carried by the carriages, an endless chain belt mounted for orbital movement along the track, means operatively connecting the carriages with the chain belt, a shaft mounted for rotation and operatively connected with the chain belt, a friction means for transmitting rotary movement to said shaft and a manually operable pawl adapted to be projected and held in the path of movement of the carriages.

7. In a cotton chopper, carriages mounted for movement in an endless path, means for moving the carriages, cutting blades carried by the carriages, means for guiding the carriages along a straight approximately horizontal path while the blades are cutting, means for stopping the movement of the carriages along the track, and mechanism for shifting said means into and out of the path of the carriages.

8. In a cotton chopper, carriages, an endless flexible connection between the carriages, cutting blades connected to the carriages, an endless track for guiding the carriages along a straight approximately horizontal path while the blades are in cutting position, means shiftable into and out of the path of the carriages for engaging any one of said carriages to stop the movement of or to release said carriages, continuously operating means for driving the carriages, said means including mechanism for automatically uncoupling the driving means from the carriages when said carriages are brought to a stop.

9. In a cotton chopper, a wheel supported structure, carriages, cutting blades connected thereto, an endless flexible connection between the carriages, an endless track engaged by the carriages and constituting means for guiding the carriages and cutting blades along straight approximately horizontal paths while the blades are in cutting position, a shaft, means for transmitting motion therefrom to said connection, a drive shaft, mechanism for transmitting motion from said drive shaft to the first mentioned shaft, said mechanism including means for automatically uncoupling the first named shaft from its operating means when said shaft is brought to a stop, and means under the control of the operator for stopping and releasing the carriages.

In testimony that I claim the foregoing as my own, I have hereto affixed my signature in the presence of two witnesses.

ALBERT DE WEESE.

Witnesses:
H. A. HUSTON,
J. C. MOORE.

Copies of this patent may be obtained for five cents each, by addressing the "Commissioner of Patents, Washington, D. C."